US009189679B2

(12) United States Patent
Yamazaki et al.

(10) Patent No.: US 9,189,679 B2
(45) Date of Patent: Nov. 17, 2015

(54) AGE ESTIMATION METHOD AND SEX DETERMINATION METHOD

(75) Inventors: Kazuhiro Yamazaki, Yokohama (JP); Akihiro Tada, Yokohama (JP); Mariko Hayashi, Yokohama (JP); Miho Ohata, Yokohama (JP); Sakura Torii, Kobe (JP)

(73) Assignee: POLA CHEMICAL INDUSTRIES, INC., Shizuoka (JP)

( * ) Notice: Subject to any disclaimer, the term of this patent is extended or adjusted under 35 U.S.C. 154(b) by 218 days.

(21) Appl. No.: 13/805,139

(22) PCT Filed: May 18, 2011

(86) PCT No.: PCT/JP2011/061367
§ 371 (c)(1),
(2), (4) Date: Dec. 18, 2012

(87) PCT Pub. No.: WO2011/162050
PCT Pub. Date: Dec. 29, 2011

(65) Prior Publication Data
US 2013/0089245 A1 Apr. 11, 2013

(30) Foreign Application Priority Data

Jun. 21, 2010 (JP) .................................. 2010-140155
Nov. 11, 2010 (JP) .................................. 2010-252402

(51) Int. Cl.
*G06K 9/00* (2006.01)
*G06K 9/36* (2006.01)
*G06T 7/00* (2006.01)

(52) U.S. Cl.
CPC ........ *G06K 9/00228* (2013.01); *G06K 9/00221* (2013.01); *G06T 7/0012* (2013.01); *G06K 2009/00322* (2013.01); *G06T 2207/30088* (2013.01); *G06T 2207/30201* (2013.01)

(58) Field of Classification Search
CPC .................. G06T 2207/30201; G06T 7/0028; G06K 2009/00322; G06K 9/00221; G06K 9/00228; G06K 9/00; G06F 19/3437
USPC ......... 382/118, 168, 162, 155, 181, 254, 276, 382/172, 169
See application file for complete search history.

(56) References Cited

U.S. PATENT DOCUMENTS 7,050,651 B2 * 5/2006 Zaklika et al. ................ 382/275
7,277,206 B2 * 10/2007 Trifonov et al. ............. 358/3.23
7,319,779 B1 1/2008 Mummareddy et al.

FOREIGN PATENT DOCUMENTS

CN 101419671 4/2009
CN 101584575 11/2009

(Continued)

OTHER PUBLICATIONS

Patent Examination Report No. 1 issued Apr. 10, 2014 in Australian patent application No. 2011270457, 6 pages total.

(Continued)

*Primary Examiner* — Sheela Chawan
(74) *Attorney, Agent, or Firm* — Hamre, Schumann, Mueller & Larson, P.C.

(57) ABSTRACT

Disclosed are novel techniques for high-precision sex determination and age estimation using facial images. The disclosed age estimation method includes: a step in which facial image data of a subject is acquired; a step in which spatial frequency intensities are calculated from the acquired facial image data; and a step in which the estimated age of the subject is calculated by applying the calculated spatial frequency intensities obtained from the facial image data.

20 Claims, 10 Drawing Sheets

(56) References Cited

FOREIGN PATENT DOCUMENTS

| CN | 101615248 | | 12/2009 |
|---|---|---|---|
| JP | 11-265443 | | 9/1999 |
| JP | 2000-014661 | | 1/2000 |
| JP | 2002-330943 | | 11/2002 |
| JP | 2002-360544 | | 12/2002 |
| JP | 2004-272849 | | 9/2004 |
| JP | 2004-283357 | | 10/2004 |
| JP | 2005-148880 | * | 6/2005 |
| JP | 2005-165447 | | 6/2005 |
| JP | 2008-282089 | | 11/2008 |
| JP | 2009-086901 | | 4/2009 |
| JP | 2009-271885 | | 11/2009 |
| JP | 2010-113526 | | 5/2010 |
| TW | 200707313 | | 2/2007 |
| WO | 2011/119117 | | 9/2011 |

OTHER PUBLICATIONS

George et al., "The role of spatial and surface cues in the age-processing of unfamiliar faces," Visual Cognition, 2000, vol. 7, No. 4, pp. 485-509.

Scherbaum et al., "Prediction of individual non-linear aging trajectories of faces," Eurographics, 2007, vol. 26, No. 3, 10 pages total.

Näsänen, "Spatial frequency bandwith used in the recognition of facial images," Vision Research, 1999, vol. 29, pp. 3824-3833.

Gaspar et al, "Spatial frequency of tuning of upright and inverted face identification," Visional Research, 2008, vol. 48, pp. 2817-2826.

International Search Report of PCT/JP2011/061367, dated Jun. 21, 2011, 2 pages total.

Miya et al., "Class-distance weighted locality preserving projection and its application to facial image based age classification," IEICE Technical Report, 2007, vol. 107, No. 207, pp. 83-88 (with English language abstract).

Kato et al., "Gender discrimination by face image features—GaborJet feature v.s. separately coded vectors of facial shape and texture—," ITE Technical Report, 2006, vol. 30, No. 17, pp. 83-86.

Takahashi et al., "Gender discrimination of face images based on discriminant analysis," ITE Technical Report, 2005, vol. 29, No. 17, pp. 43-46 (with English language abstract).

Ono et al., "Age estimation method using facial feature," Dai 71 Kai (Heisei 21 Nen) Zenkoku Taikai Koen Ronbunshu (2), Jinkochino to Ninchi Kagaku, 2009, pp. 2-433-2-434.

Takimoto et al., "A robust gender and age estimation under varying facial pose," The Transactions of the Institute of Electrical Engineers of Japan C, 2007, vol. 127, No. 7, pp. 1022-1029 (with English language abstract).

Office Action issued May 22, 2015 in corresponding Taiwan patent application, 7 pages total.

Office Action issued in corresponding Chinese application, dated Oct. 23, 2014, 24 pages total (English language translation provided).

Ueki et al., "Class distance weighted locality preserving projection for automatic age estimation," BTAS 2008 IEEE Second International Conference on Biometrics: Theory, Applications and Systems (2008), IEEE Conference Publications, 6 pages total.

Office Action issued in corresponding Singapore application, dated Nov. 17, 2014, 12 pages total.

* cited by examiner

AGE ESTIMATION METHOD AND SEX DETERMINATION METHOD

TECHNICAL FIELD

The present invention relates to an age estimation method, an age estimation apparatus, an age estimation program, a sex determination method, a sex determination apparatus, and a sex determination program. More specifically, the invention relates to an age estimation method, an age estimation apparatus, and an age estimation program that use spatial frequencies, and a sex determination method, a sex determination apparatus, and a sex determination program that use spatial frequencies.

BACKGROUND ART

Not only women but also all the people desire to remain young. For this reason, there are various cosmetic means, such as esthetic treatments, basic skin care products, makeup products, special makeup, health foods, or cosmetic surgeries.

Objective evaluation of the youth, especially the youth of a face, in other words, objective evaluation of the gap between an actual age and an "impression age by appearance" is extremely important in evaluating the effect of various cosmetic means such as esthetic treatments and cosmetic materials.

However, for example, in order to evaluate the effect of esthetic treatments or cosmetic materials, when an impression age by appearance is used, the impression age by appearance may be influenced by the difference among evaluators or between sexes, so there is a problem in that the reproducibility of the evaluation may not be obtained.

The technique of estimating an age with good reproducibility is greatly needed in a wide variety of fields starting from the evaluation of the effect on the various cosmetic means such as esthetic treatments and cosmetic materials as described above to verification of age or marketing for liquor, cigarettes, and the like, security system for confirming the characteristic of the face for security, and the like.

In view of the circumstances, as an example of the technique, an age estimation method by using actual measurement value or sensory evaluation value of the size or the length of the eyes, the mouth, the nose, and the chin as a characteristic value has been known (Patent Literatures 1 and 2). In addition, an age estimation method that uses scores of the wrinkles or the flabbiness has been known (Patent Literature 3). In addition, a technique of estimating the age change based on the physical amounts (the size and the distance) of the portions or the component parts of the face (Patent Literature 4).

In recent years, according to the advance of image processing and statistical analysis processing in addition to the advance of imaging devices, there has been a dramatic advance in a system for monitoring and recognition by storing facial images on a computer quickly and accurately, recognizing an age group, a sex, and characteristics of the face, and estimating the person.

As examples of the technology, there have been known an age estimation system by using values from an image process such as an edge process or a binary process which is a characteristic amount contained in images (for example, Patent Literatures 5 and 6), a person attribution estimation technology by using characteristic values (the position, the shading, and the number of wrinkles) of characteristic points such as eyes, a nose, and a mouth (for example, Patent Literature 7), an age estimation technology for selecting a discriminator and a method for applying dimension compression to an image based on a perception age distance of a person as an evaluation standard (for example, Patent Literature 8). In addition, an age and sex determination technology by using similarity of characteristic information of a facial image (shading information per portion of the image, the size of the portion and the like) is disclosed (for example, Patent Literature 11).

Meanwhile, recently, a technology focusing on spatial frequencies, that is, a technology focusing on the change of the texture characteristics of an image by spatial cycles is developed. For example, a method of preparing a simulation image of skins presenting various textures according to the changes of spatial frequencies is disclosed (for example, Patent Literature 9).

The applicant of the invention discloses a technology of evaluating the effect on the "three dimensional effect of a face" that a makeup has, by performing spatial frequency pattern analysis at the time of the makeup by using the technology of using the spatial frequencies (for example, Patent Literature 10).

CITATION LIST

Patent Literature

Patent Literature 1: JP 11-265443 A
Patent Literature 2: JP 2000-014661 A
Patent Literature 3: JP 2002-330943 A
Patent Literature 4: JP 2002-360544 A
Patent Literature 5: JP 2009-086901 A
Patent Literature 6: JP 2009-271885 A
Patent Literature 7: JP 2008-282089 A
Patent Literature 9: JP 2004-283357 A
Patent Literature 10: JP 2004-272849 A
Patent Literature 11: JP 2005-165447 A

DISCLOSURE OF THE INVENTION

Problem to be Solved by the Invention

The methods of estimating an age based on the physical formation such as the size of a portion of a face and the length between the portions as disclosed in Patent Literatures 1, 2, and 4 are difficult in specifying a position that is a measurement standard of each subject, and the age may not be estimated with a high degree of accuracy.

In addition, the method of estimating an age based on the sensory evaluation as disclosed in Patent Literature 2 has a problem in that personal differences among evaluators greatly influence the age estimation. In addition, since the method of estimating an age by using scores of wrinkles or flabbiness as disclosed in Patent Literature 3 only focuses on specific portions where the wrinkles and flabbiness are easily seen, it is difficult to evaluate an age of a subject in a wide range of the age group including relatively young people. In addition, there is a problem in that it difficult for the portion to be specified as described above.

The technology disclosed in Patent Literatures 5 and 6 is to increase the degree of accuracy of an age estimation by combining results of age estimation based on a plurality of different standards. In addition, the technology disclosed in Patent Literature 8 is to obtain an estimated value close to the result perceived by that a person based on the specific evaluation standard which is a perception age distance. In addition, the technology relating to Patent Literature 11 is to minimize the estimation error based on the specific index of a degree of similarity. These technologies are to minimize the estimation error by preparing a plurality of standards for the calculation of any kind of age estimation.

In addition, the technology disclosed in Patent Literature 7 is a technology to correct scores used in estimation on the basis of a certain condition and to mainly focus on improving the accuracy of input data used in the estimation.

As described above, conventionally, the characteristic values used in estimating an age or determining a sex by using a facial image is limited to the size of a portion of a face, the distance between portions, the scores indicating the number of wrinkles or the condition, the shading of the portion of a face, or the processed value thereof. In addition, in the conventional method of determining an age or a sex, in order to increase the evaluation accuracy, it is necessary to process information for specifying a plurality of portions of the face or to prepare a plurality of standards to increase estimation accuracy.

Therefore, the purpose of the invention is to provide a novel technology for estimating an age with a high degree of accuracy and reproducibility in the age estimation by using facial images. In addition, the purpose of the invention is to provide a novel technology for determining a sex with a high degree of accuracy and reproducibility in the sex determination by using the facial images.

Means for Solving Problem

In view of the foregoing circumstances, as a result of a diligent effort to obtain a technology for estimating an age or determining a sex accurately, the inventors of the invention found out that there are close correlations among ages and intensities of spatial frequencies obtained from facial image data, or sexes and the intensities of the spatial frequencies. Further, as a result of analyzing the correlations, the inventors found out that various kinds of information on aging structures and characteristics of sex difference which relates to age estimation and a sex determination is unevenly distributed per spatial frequency. Then, the inventors found out that the estimation of an age an actual age or an impression age by appearance) and the determination of the sex may be performed with a high degree of accuracy and reproducibility by using the intensities of the spatial frequencies belonging to spatial frequency bands that are closely related to the information on the aging structure or characteristics of sex difference thereby completing the invention.

Therefore, the invention is as follows.

The invention to solve the problem relates to an age estimation method including estimating an age of a subject from facial image data of the subject based on a correlation between ages and intensities of spatial frequencies obtained from facial image data.

As described in an embodiment described below, since intensities of spatial frequencies have a high correlation with ages, an age of a subject may be estimated from facial image data of the subject with a high degree of accuracy and reproducibility.

In a preferred embodiment of the invention, the correlation is indicated by an equation or a model, and an estimated age of the subject is obtained by applying intensities of spatial frequencies obtained from the facial image data of the subject to the equation or the model.

By using the equation or the model indicating the correlation, an age may be easily estimated by using a computer or the like.

In a preferred embodiment of the invention, the age estimation method may include the following steps of:
  obtaining facial image data of a subject;
  calculating intensities of spatial frequencies from the obtained facial image data; and
  calculating an estimated age of the subject by applying the calculated intensities of the spatial frequencies to an equation or a model that is prepared in advance and indicates a correlation between ages and intensities of spatial frequencies obtained from the facial image data.

In a preferred embodiment of the invention, the equation is a multiple regression equation obtained from multiple regression analysis or a prediction equation obtained from PLS.

By using the multiple regression equation or the prediction equation, an estimated age of a subject may be obtained with a higher degree of accuracy.

As the facial image data, image data of an entire face or a portion of a face may be used. That is, the age may be estimated accurately even when the used facial image is an image of an entire face or a portion of face.

The invention may be used in estimating an actual age and in estimating (evaluating) of an impression age by appearance. When an actual age is estimated, a correlation between actual ages and intensities of spatial frequencies may be used, and when an impression age by appearance is estimated, a correlation between impression ages by appearance and intensities of spatial frequencies may be used.

In a preferred embodiment of the invention, color image data is used as the facial image data, and the intensities of the spatial frequencies include combinations of intensities of spatial frequencies calculated from a plurality of color channels.

By using intensities of spatial frequencies calculated from color channels in combination, comparing with the case of only using intensities of spatial frequencies calculated from monochrome facial data (brightness data), an age, especially an impression age by appearance may be estimated (evaluated) with a high degree of accuracy.

In a preferred embodiment of the invention, the spatial frequencies belong to a plurality of different spatial frequency bands.

By using the intensities of the spatial frequencies belonging to the plurality of different spatial frequency bands, an age may be estimated with a high degree of accuracy.

In a preferred embodiment of the invention, the spatial frequency bands are low band of 50 cycles/image-width or less and high band of larger than 50 cycles/image-width.

By using the intensities of the spatial frequencies in low frequency band and high frequency band in combination, information on different kinds of aging structures may be used in combination, so the age may be estimated with a higher degree of accuracy.

In the case of using the different spatial frequencies, these frequencies preferably have a difference of 10 cycles/image-width or more. According to this, information on different kinds of aging structure may used more effectively, so the age may be estimated with a higher degree of accuracy.

In a preferred embodiment of the invention, the subject is a female, the correlation is a correlation between ages and intensities of spatial frequencies obtained from facial image data of entire faces of females, and the spatial frequencies include at least four spatial frequencies that belong to respective spatial frequency bands as follows:
  0 to 50 cycles/image-width;
  50 to 100 cycles/image-width;
  100 to 200 cycles/image-width; and
  200 cycles/image-width or more.

According to this, the spatial frequency bands that include information on aging structure specific to females are used effectively, so the age may be estimated with a high degree of accuracy.

In a preferred embodiment of the invention, the subject is a male, the correlation is a correlation between ages and intensities of spatial frequencies obtained from facial image data of entire faces of males, and the spatial frequencies include at least four spatial frequencies that belong to respective spatial frequency bands as follows:

0 to 50 cycles/image-width;
50 to 100 cycles/image-width;
100 to 150 cycles/image-width; and
150 cycles/image-width or more.

According to this, the spatial frequency bands that include information on aging structure specific to males are used effectively, so the age may be estimated with a high degree of accuracy.

In a preferred embodiment of the invention, the correlation is a correlation between ages and intensities of spatial frequencies obtained from image data of lips, and the spatial frequencies include at least three spatial frequencies that belong to respective spatial frequency bands as follows:

0 to 40 cycles/image-width;
40 to 100 cycles/image-width; and
100 cycles/image-width or more.

According to this, from limited portions of lips, the spatial frequency bands that include information on aging structure specific to the lips are used effectively, so the age may be estimated with a high degree of accuracy.

In addition, the invention to solve the problem relates to an age estimation apparatus including an intensity calculating unit that calculates intensities of spatial frequencies from facial image data of a subject, storage unit that stores age correlation data indicating a correlation between ages and intensities of spatial frequencies obtained from the facial image data, and an age calculating unit that calculates an estimated age of the subject by matching the intensities of the spatial frequencies calculated by the intensity calculating unit with the age correlation data stored in the storage unit.

The age estimation apparatus according to the invention may estimate the age from the facial image data of the subject with a high degree of accuracy.

In addition, the invention to solve the problem relates to an age estimation program causing a computer to function as an intensity calculating unit that calculates intensities of spatial frequencies from facial image data of a subject, a storage unit that stores age correlation data that indicates a correlation between ages and intensities of spatial frequencies obtained from facial image data, and an age calculating unit that calculates an estimated age of the subject by matching the intensities of the spatial frequencies calculated by the intensity calculating unit with the age correlation data stored in the storage unit.

The age estimation program according to the invention causes the computer to estimate the age from the facial image data of the subject with a high degree of accuracy.

The invention to solve the problem relates to sex determination method including determining a sex of a subject from facial image data of the subject based on a correlation between sexes and intensities of spatial frequencies obtained from facial image data.

As described in the embodiment as described below, since intensities of spatial frequencies have a high correlation with sexes, a sex of a subject may be determined from facial image data of the subject with a high degree of accuracy.

In a preferred embodiment of the invention, the correlation is indicated by an equation or a model so the sex of the subject is determined by applying the intensities of the spatial frequencies from the facial image data of the subject to the equation or a model.

By using the equation or a model that indicates the correlation, the sex may be easily determined by using a computer and the like.

In a preferred embodiment, the equation is a discriminant function obtained by discriminant analysis.

By using the discriminant function, the sex of the subject may be determined with a high degree of accuracy.

In a preferred embodiment, the spatial frequencies belong to bands from 100 to 250 cycles/image-width.

By using the intensities of the spatial frequencies in the bands, the sex may be determined with a high degree of accuracy by effectively using information on structures that present differences between sexes.

In a preferred embodiment of the invention, the sex determination method includes the following steps of:

acquiring facial image data;
calculating intensities of spatial frequencies from the acquired facial image data;
acquiring a sex grouping variable by applying the calculated intensities of the spatial frequencies to a discriminant function that is prepared in advance and indicates a correlation between sex grouping variables and the intensities of the spatial frequencies obtained from the facial image data; and
determining a sex based on the obtained grouping variable.

In addition, the invention to solve the problem relates to a sex determination apparatus including an intensity calculating unit that calculates intensities of spatial frequencies from facial image data of a subject, a storage unit that stores sex correlation data that indicates a correlation between sexes and intensities of spatial frequencies obtained from the facial image data, and a sex determining unit that determines a sex of the subject by matching the intensities of the spatial frequencies calculated by the intensity calculating unit with the sex correlation data stored in the storage unit.

The sex determination apparatus according to the invention determines the sex from the facial image data of the subject with a high degree of accuracy.

In addition, the invention to solve the problem relates to a sex determination program causing a computer to function as an intensity calculating unit that calculates intensities of spatial frequencies from facial image data of a subject, a storage unit that stores sex correlation data indicating a correlation between sexes and intensities of spatial frequencies obtained from facial image data; and a sex determining unit that determines a sex of the subject by matching the intensities of the spatial frequencies calculated by the intensity calculating unit with the sex correlation data stored in the storage unit.

The sex determination program according to the invention causes the computer to determine the sex from the facial image data of the subject with a high degree of accuracy.

In addition, the invention to solve the problem relates to an age estimation apparatus including an intensity calculating unit that calculates intensities of spatial frequencies from facial image data of a subject, a storage unit that stores sex correlation data indicating a correlation between sex and intensities of spatial frequencies obtained from facial image data, and male age correlation data and female age correlation data indicating correlations between ages and intensities of spatial frequencies obtained from facial image data by sex, a sex determining unit that determines a sex of the subject by matching the intensities of the spatial frequencies calculated by the intensity calculating unit with the sex correlation data stored in the storage unit, an age correlation data selecting unit that selects the male age correlation data or the female age correlation data based on the sex determined by the sex determining unit, and an age calculating unit that calculates an estimated age of the subject by matching the intensities of the spatial frequencies calculated by the intensity calculating unit with the correlation data selected by the correlation data selecting unit.

Since the age estimation apparatus according to the invention estimates the age by using correlation data considering aging structures specific to the sex depending on the sex determination result, the age may be estimated with an extremely high degree of accuracy.

Effect of the Invention

According to the invention, by using spatial frequencies obtained from facial image data, an age (an actual age or an impression age by appearance) may be estimated with a high degree of accuracy and reproducibility, or a sex may be determined with a high degree of accuracy and reproducibility.

In addition, by using an age estimating technique or a sex determining technique according to the invention, an effect of makeup or esthetic treatments or cosmetic materials may be evaluated easily.

DESCRIPTION OF EMBODIMENTS

[1] Age Estimation Method According to the Invention

The invention relates to an age estimation method including estimating an age of a subject from facial image data of the subject based on a correlation between ages and intensities of spatial frequencies obtained from facial image data. The correlation is preferably indicated, by an equation or a model.

The equation or the model is preferably a regression equation or a regression model, and more preferably a multiple regression equation or a prediction equation.

<Definition of Actual Age and Impression Age by Appearance>

An "age" in the invention includes an actual age and an impression age by appearance.

The "actual age" refers to an age determined by a date of birth, and a technology of estimating the actual age may be provided to various use such as various monitoring systems as described above.

On the other hand, an "impression age by appearance" refers to an age by an impression objectively estimated by a third party, and is under the assumption that an impression by appearance looks younger or older than an actual age. The technology of estimating the impression age by appearance is useful in evaluating the effect of various cosmetic means. In addition, it is useful in evaluating a change of an impression age by appearance by various cosmetic means. For example, it may be applied in evaluating a change of at impression age by appearance by makeup. In addition to an impression age by an entire appearance, the impression image by appearance may include an impression age by appearance focusing on a specific aging phenomenon, for example, a "freckle age" focusing on a freckle condition, a "wrinkle age" focusing on a wrinkle condition, a "skin texture age" focusing on a texture of a skin, and the like.

<Facial Image Data>

As facial image data of subject used in the invention, the entire face image data or image data of a portion of the face may be used.

Figure 1:
FIG. 1 is a grayscale facial image of 1024×1024 pixels (a photograph as a substitute for a drawing).

When image data of an entire fade is used, it is preferable to use the entire face data excluding a hair portion (see FIG. 1). According to this, an age may be estimated with a higher degree of accuracy. In consideration of the sampling theorem for calculating the intensities of the spatial frequencies and the resolutions required to estimate an actual age or an impression age by appearance, the size of the face image in this case may be captured in the range of 30 cm×30 cm, and the image is preferably 512×512 pixels or more. As described later, it is because the number of pixels relate to the extent of the spatial frequency band included in an image.

The image data of the portion of the face includes image data of the lips, the eyes, the nose, the forehead, the cheek, the neck, and the like. Among them, the image data of the lips or the image data of the cheek is preferably used. This is done for estimating the age with a high degree of accuracy since the intensities of the spatial frequencies obtained from the image data of the lips have a high with an age as described in the following examples. For example, when the image of the portion such as the lips, the eyes, and the nose is used, it is preferable to use an image of the entire portion. In addition, when an image of a portion of a face such as a cheek or a forehead is used, it is preferable to use an image of the portion in the range of at least 2 cm×2 cm. According to this, the information on ether aging structures can be acquired sufficiently, so the age can be estimated with a high degree of accuracy. In addition, in such a case, the number of pixels of the image data is preferably 256 pixels or more, and more preferably 512 pixels or more. As described later, this is because the number of pixels relate to the extent of the spatial frequency band included in an image.

In addition, in the present invention, the facial image data may be monochrome image data (brightness data) or color image data. A monochrome image or a color image may be selected according to the purpose or the usage. For example, in case of estimating an age where the effect of the skin color, the skin trouble, or the like is suppressed, it is preferable to use monochrome image data.

When color image data is used, the data obtained from any channels among the data from the RGB color channels may be used singly or in combination. In addition, the monochrome image data (brightness data) to be converted hereinafter may be further combined to be used. For example, when freckle information by aging may be effectively used to estimate the "freckle age", it is preferable to use the B channel data of the color image. In addition, when an age is estimated by deleting freckle information and focusing on skin texture, wrinkles, or the like, it is preferable to use the R channel data of the color image without using the B channel data of the color image.

In addition, by using the intensities of the spatial frequencies calculated in every color channel in combination, the comprehensive impression age by appearance can be estimated with a high degree of accuracy compared to the case of only using the intensities of the spatial frequencies calculated from the monochrome image data. In addition, it is preferable to use the intensities of the spatial frequencies calculated in every color channel and the intensities of the spatial frequencies calculated from the monochrome image data in combination since a comprehensive impression age by appearance may be estimated with a high degree of accuracy. In this point of view, it is preferable that the color channels used herein include the combination of the R channel and the B channel. In addition, it is preferable to include the combination of all RGB channels.

The "facial image data" may be acquired according to a conventional method. For example, the frontal face is captured and the captured image is input to a personal computer as digital information by using a digital camera and the like.

<Definition of Spatial Frequency>

As known in advance, the "spatial frequency" refers to a characteristic of any structure that has a spatial cycle and indicates the number of the structural repetitions included in a unit length. In the SI unit, the spatial frequency refers to cycles per meter, but in the image processing field, the spatial frequency refers to the number of lines per millimeter.

In addition, as a unit of the spatial frequency, the number of cycles per image width (cycle/image-width) may be used.

The maximum number of cycles included in an image is the half number of the pixels (dots) included in the image width. That is, when the image has the image width of 512 pixels, the spatial frequency band is 0 to 256 cycles/image-width, and when the image has the image width of 1024 pixels, the spatial frequency band is 0 to 512 cycles/image-width.

<Method of Calculating Intensity of Spatial Frequency>

The "intensities of the spatial frequencies" refer to amplitude values or powers (the logarithms of powers) in respective spatial frequencies.

Figure 2:
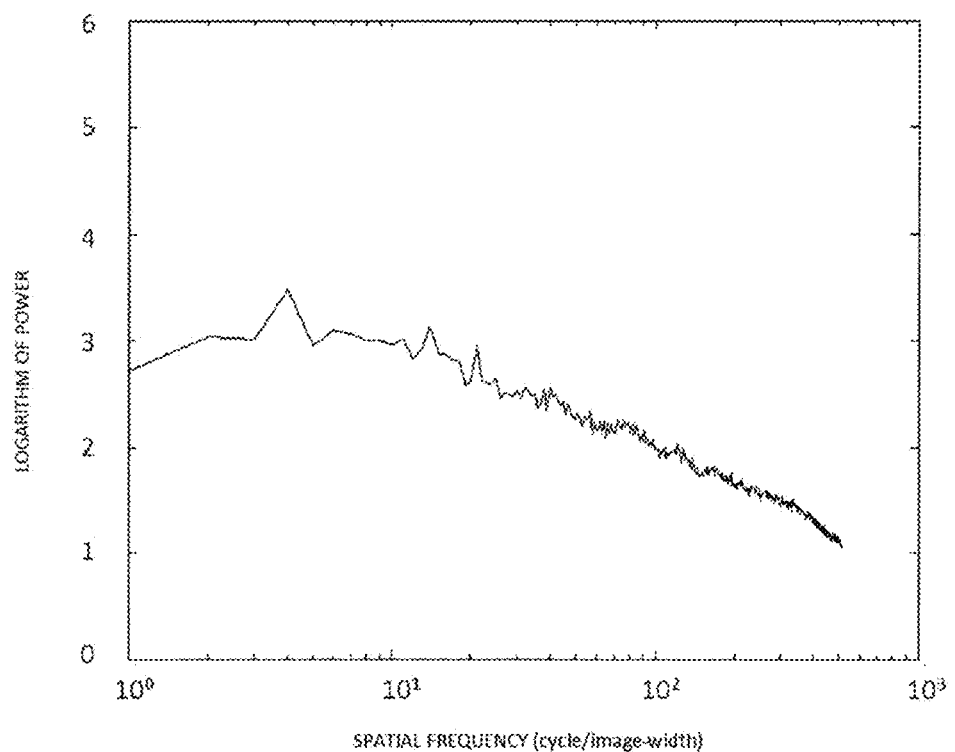
FIG. 2 is a graph indicating a spectrum pattern of spatial frequencies of the facial image (spatial frequencies versus logarithm of power).

The intensities of the spatial frequencies may be calculated from the facial image data according to a conventional method. When monochrome image data is used, brightness data (monochrome image data) from the facial image data may be adjusted by using, for example, a commercially available image processing software (for example, Photoshop (registered trademark) CS3 manufactured by Adobe systems incorporated or NanoHunter NS2K-Pro (registered trademark) manufactured by Nano System Corp.). When an FFT (Fast Fourier Transform) is performed on the adjusted monochrome image data or the adjusted color image data by using a commercially available image analysis software (for example, a Fourier phase analysis program manufactured by image Sense Co. Ltd., and PopImaging manufactured by Digital Being Kids) and the like, the amplitude value or the power that is the intensity of the spatial frequency may be calculated. FIG. 2 illustrates a spectrum pattern that is a result of FFT processing to the grayscale image of 1024×1024 pixels as an example of the spatial frequency analysis. By the FFT processing, the intensity (an amplitude value or a power) per spatial frequency of 0 to 1024/2 (unit: cycle/image-width) is calculated so that the spatial frequency characteristic that includes the facial image has becomes clear.

In addition, in case of the color image, the intensities of the spatial frequencies are calculated per color channel.

The great advantage of the invention is to easily obtain numerical data (intensities of spatial frequencies (power spectrums)) required to estimate an age from facial image data of a subject. That is, in the conventional art, in order to calculate the sizes of the respective portions or the distances between portions required for the age estimation, when given positions per facial image data of the subject should be specified in detail and the positions are not specified correctly, the estimation precision decreases. However, the intensities of the spatial frequencies required for the age estimation used in the invention may be quantitatively calculated with ease by using a commercially available software that is used conventionally.

<Age Estimation Method>

In the invention, an age of a subject is estimated based on the correlation of ages and intensities of spatial frequencies obtained from facial image data analyzed in advance from the intensities of the spatial frequencies obtained from the facial image data of the subject whose age is to be estimated according to the method described above.

As the intensities of the spatial frequencies used in the estimation, any intensity of the spatial frequency may be used, but it is preferred to use spatial frequencies that belong to a plurality of different spatial frequency bands since the estimation may be performed with a high degree of accuracy. In a preferred embodiment of the invention, the spatial frequency bands may be low frequency ranges of 50 cycles/image-width or less, and high frequency ranges of larger than 50 cycles/image-width. In a more preferred embodiment, the high frequency ranges may be divided into medium frequency ranges of 50 to 100 cycles/image-width and the high frequency ranges of 100 cycles/image-width or more.

By using the intensities of the spatial frequencies in different bands, the information on different aging structures existing in respective bands may be used in combination so that an age may be estimated comprehensively.

In addition, in this case, the pluralities of the spatial frequencies preferably have differences of 10 cycles/image-width or more, or more preferably differences of 20 cycles/image-width or more. Accordingly, the information on different aging structures may be used effectively.

The correlation of ages and intensities of spatial frequencies obtained from a facial image data may be calculated in advance by multivariate analysis such as regression analysis.

Hereinafter, a method of calculating the correlation is described with a case of estimating an impression age by appearance from intensities of spatial frequencies obtained from facial image data as an example.

(1) Estimation of Impression Age by Appearance

In order to obtain an equation or a model indicating correlation of impression ages by appearance and intensities of spatial frequencies obtained from facial image data, evaluators visually estimate impression ages by appearance of a plurality of people.

The number of the estimated people may be at least 50 or more, preferably 100 or more, and more preferably 500 or more. In addition, it is preferable that each age group has the same number of people.

With regard to the impression age by appearance, since the self-evaluation is different from the evaluation by a third party in many cases, it is preferable that the evaluator is a third party. Evaluators who evaluate the impression ages by appearance may be selected in a viewpoint of selecting evaluators who appropriately represent the third party, and it is important to consider various issues such as individual differences, sex differences, age differences, and preference of the evaluators, and further reproducibility and the like. Evaluators who have specialties and experience such as evaluation, for example, in a cosmetic field are preferably included. It is preferable that the number of the evaluators is plural, specifically about 5 to 10. The objective impression age by appearance of each person may be obtained by statistically processing the estimation result by the plurality of estimators, for example, by calculating mean values, median values, or the like excluding outliers.

Figure 3:
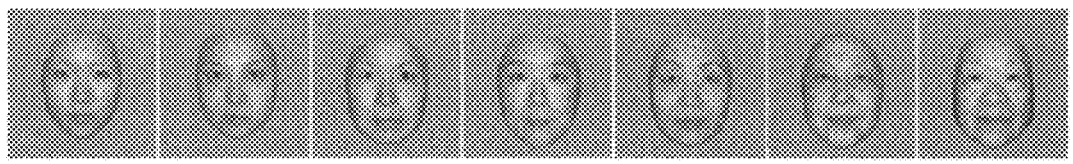
FIG. 3 is a drawing illustrating examples of standard pictures of the facial images for age groups used for an impression age by appearance (a photograph substituted for a drawing).

In addition, in order to improve the reproducibility of the evaluation, it is more preferable to use a reference picture or the like as an evaluation criterion. For example, it is preferable to prepare standard pictures of each age group at intervals of 5 to 10 years in advance, and determine an age difference from the standard picture that is the criterion, or to present an actual age and estimate the difference. FIG. 3 is a drawing illustrating exemplary standard pictures of the facial image in each age group from 20 to 80 at intervals of 10 years. As it moves to the right, the age group increases. The method of preparing standard pictures may include a method of selecting standard pictures from a facial picture database of age groups by an expert of facial recognition, a method of preparing average facial images by processing a plurality of facial pictures of age groups with morphing software, and the like. In any cases in the art, when the population that is the base of the preparation is about 100, the prepared picture may be a reference picture that has a certain level of reliability, and when the population exceeds 1000, the prepared picture may be a reference picture that has sufficiently high level of reliability.

The impression age by appearance of a person may be evaluated in contact with the person. However, as described later, it is preferable that the evaluation is performed by using a captured facial image of the person. This is because, as illustrated in FIG. 1, the influence that decreases the evaluation accuracy caused by, for example, an expression, a hair style, a background, a skin color, a skin trouble, or the like may be excluded.

(2) Calculation of Intensity of Spatial Frequency

Next, the intensities of the spatial frequencies are calculated from facial image data in which the pluralities of people are captured. The intensities of the spatial frequencies are calculated as described above. The facial image used herein is preferably the same with the facial image used in the evaluation of the impression age by appearance. Accordingly, the correlation between impression ages by appearance and the intensities of the spatial frequencies may be calculated with a higher degree of accuracy.

(3) Preparation of Database (DB)

In order to calculate the correlation, a database (DB) in which the intensities of the spatial frequencies and impression ages by appearance are associated is prepared.

The DB for preparing an equation or a model that is arranged in advance, and that indicates relation between the impression ages by appearance and the intensities of the spatial frequencies are preferably prepared by sex and by race. In addition, each age group preferably has the same population distribution. In addition, the population of the DB is at least 50 or more, preferably 100 or more, and more preferably 500 or more. When the structure of the DB is, for example, a matrix form where people may be input to a row, and the impression ages by appearance calculated as described above, the intensities of the spatial frequencies calculated from the facial image data may be input as the column items.

In addition, in order that the DB may be also used for estimating an actual age as described later or determining a sex as described later, the column item may further include actual ages of people captured in the facial images and sex grouping variables indicating sexes.

The DB may be updated by adding the intensities of the spatial frequencies and the estimated value after estimating an impression age by appearance from a newly acquired facial image data of a subject. An equation or a model can be updated by performing multivariate analysis as described later, if necessary. It is because the estimation accuracy increases by the update.

The DB may be used in the estimation of the actual age in the same manner. Though the usage of the DB will be described more specifically in Examples 1 and 2 which will be described later, the following may be understood by the usage of the DB. For example, when correlation coefficients between ages and powers per spatial frequency are calculated by performing correlation analysis on the estimated spatial frequency powers and the age, the spatial frequency band with a high correlation coefficient may be specified, and thus the band that include an extremely large amount of information on aging structure (aging information) may be known (FIG. 4: correlation analysis on a DB of females, FIG. 5: correlation analysis on a DB of males). In addition, when cluster analysis (Ward's method by an average Euclidean distance) on the spatial frequencies is performed, the relation between the spatial frequency band and the characteristic of the facial image is clearly figured out so that the aging information included in each spatial frequency band is specifically understood.

When cluster analysis is performed on the spatial frequencies included in the DB prepared in an examples described later, the uneven distribution of the aging information per spatial frequency band, for example, information on tense feelings or flabbiness in 0 to 50 (cycles/image-width) and information on deep wrinkles and face lines in 50 to 100 (cycles/image-width) from a dendrogram is presented. Therefore, from each spatial frequency band, by selecting the spatial frequencies and using the spatial frequencies in combination as explanatory variables in a regression equation or a prediction equation, the age may be estimated with a high degree of accuracy.

(4) Preparation of Equation or Model

In order to prepare an equation or a model that indicate a correlation between the impression ages by appearance and the intensities of the spatial frequencies, it is preferable to perform multivariate analysis on the impression ages by appearance and the intensities of the spatial frequencies by using the DB. Multivariate analysis preferably use the relation between the objective variable and the explanatory variable, and a preferred example of multivariate analysis includes discriminant analysis and regression analysis (MLR, PLS, PCR, Logistic analysis). Among these, multiple regression analysis (MLR), and nonlinear regression analysis (PLS: Partial Least Squares) are particularly preferable. For example, when multiple regression analysis is performed on intensities of spatial frequencies as explanatory variables and impression ages by appearance as objective variables, a multiple regression equation may be obtained. In addition, when a PLS may performed in the same manner, a prediction equation (prediction model) may be obtained.

In addition, in order to obtain an equation or a model that has a high degree of accuracy, multivariate analysis such as principal component analysis, factor analysis, Quantification Theory Type I, Quantification Theory Type II, Quantification Theory Type III, multidimensional scaling, supervised clustering, a neural network, and an ensemble learning may be used appropriately. Among these, a neural network, discriminant analysis, and Quantification Theory Type I are preferable.

These multivariate analyses may be performed by using free software or commercially available software.

The intensity of the spatial frequency which is an explanatory variable in the equation or the model obtained as described above is preferably intensities of spatial frequencies which belong to a plurality of different frequency bands. By using the intensities of the spatial frequencies that belong to the plurality of the different spatial frequency bands, an age may be estimated with a high degree of accuracy. In a preferred embodiment of the invention, the spatial frequency bands may be low frequency ranges of 50 cycles/image-width or less, and high frequency ranges of larger than 50 cycles/image-width. In a more preferred embodiment, the high frequency ranges may be divided into medium frequency ranges of 50 to 100 cycles/image-width, and the high frequency ranges of larger than 100 cycles/image-width.

By using the intensities of the spatial frequencies in different bands, the different aging information existing in respective bands may be used in combination and an age may be comprehensively estimated with a high degree of accuracy.

In addition, in this case, the plurality of the spatial frequencies preferably have difference of 10 cycles/image-width or more, or more preferably have difference of 20 cycles/image-width or more. Accordingly, the different aging information may be used effectively.

Further, in order to estimate the age with a high degree of accuracy, the used spatial frequency band may be optimized depending on the sex. When an age of a female is estimated by using image data of an entire face, it is preferable to use at least four spatial frequencies that belong to respective bands as follows. As described in an examples described later, the bands are specified by analyzing data acquired from a plurality of people by cluster analysis and classifying the data into the spatial frequencies with similar change characteristics in the spatial frequency power.

(Age Estimation of Female)
0 to 50 cycles/image-width
50 to 100 cycles/image-width
100 to 200 cycles/image-width
200 cycles/image-width or more In addition, when an age of a male is estimated by using image data of an entire face, it is preferable to use at least four spatial frequencies that belong to respective bands as follows.

(Age Estimation of Male)
0 to 50 cycles/image-width
50 to 100 cycles/image-width
100 to 150 cycles/image-width
150 cycles/image-width or more As understood by comparing both, it is preferable to use high spatial frequencies of 200 cycles/image-width or more for estimating an age of a female, but it is not necessary to use such spatial frequencies for estimating an age of a male because aging information of a female exists in high frequency ranges, while aging information of a male hardly exists in high frequency range.

In this regard, the upper limit of the spatial frequency bands used for estimating an age of a female may be about 500 cycles/image-width, while the upper limit of the spatial frequency band used for estimating an age of a male may be about 200 cycles/image-width as a standard.

Further, in order to estimate the age with a high degree of accuracy, the used spatial frequency band may be changed depending on the portion used for the estimation. When image data of lips is used, it is preferable to use at least three spatial frequencies that belong to respective bands as follows. As described in an example described later, the bands are specified by analyzing data acquired from a plurality of people by cluster analysis and classifying the data into the spatial frequencies with similar change characteristics in the spatial frequency power.

(Age Estimation Using Lips)
0 to 40 cycles/image-width.
4.0 to 100 cycles/image-width
100 cycles/image-width or more Since the lips rarely include aging information in a high frequency range of 240 cycles/image-width or more, the band may not be used necessarily. In this regard, the standard upper limit of the spatial frequency range bands used for estimating an age from image data of the lips may be about 240 cycles/image-width as a standard.

The method of calculating a correlation between intensities of spatial frequencies and impression ages by appearance is described hereto. However, in case of estimating actual ages, the correlation between the intensities of the spatial frequencies and the actual ages may be calculated in the same manner.

(5) Age Estimation

An age (an actual age or an impression age by appearance) is estimated by applying intensities of spatial frequencies from facial in data of a subject to an equation or a model Indicating a correlation between ages and intensities of spatial frequencies obtained by the method as described above. The application of the equation or the model includes matching numerical values to a model in addition to substituting numerical values to an equation.

According to this, an estimated value of an age may be obtained.

Figure 6:
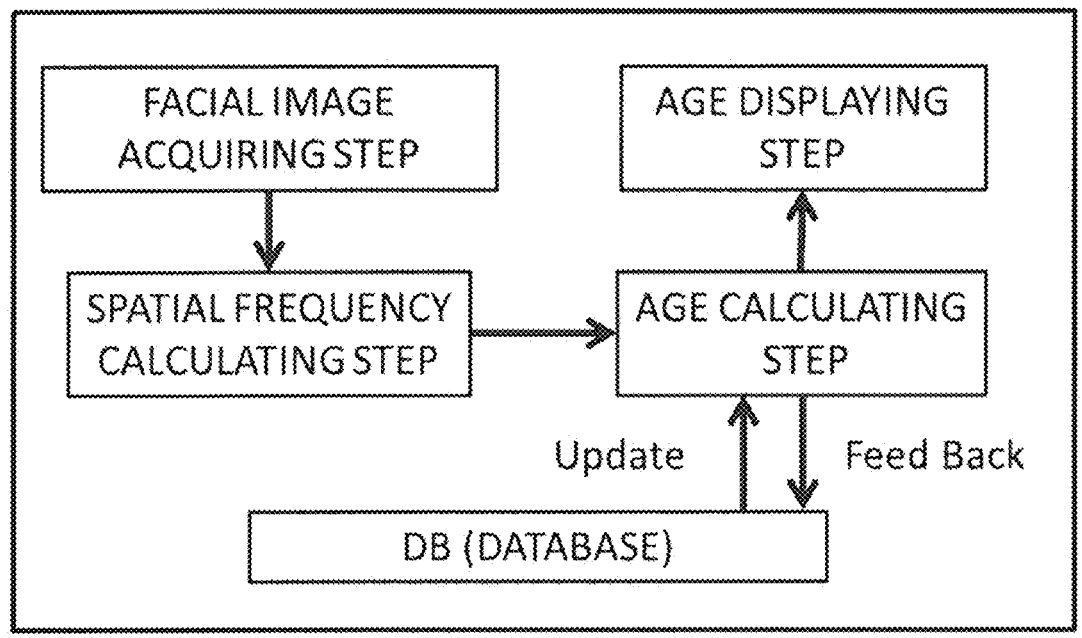
FIG. 6 is a diagram illustrating a process of an estimation method of an impression age by appearance.

FIG. 6 is a diagram indicating a process example of a method of estimating an age (an actual age or an impression age by appearance) by using the spatial frequencies in the invention. In other words, the intensities of the spatial frequencies may be calculated by acquiring facial image data of a subject whose age is be estimated (a facial image acquiring step), and then calculating the intensities of the spatial frequencies by performing a FFT process on the facial image data (a spatial frequency calculating step). An estimated age is calculated by substituting the intensities of the spatial frequencies (powers or amplitude values) of the subject to an equation (a regression equation or the like) or a model (a Prediction equation) indicating a "relation between ages and intensities of spatial frequencies", as prepared in advance (an age calculating step). The calculated estimated age may be displayed on a display or the like (an age displaying step). In addition, the equation or the model may be updated by adding the estimated age calculated in the age estimating process to the DB along with the intensities of the spatial frequencies (feed-back). This is because the estimation accuracy increases by the update.

[2] Age Estimation Apparatus According to the Invention

An estimation apparatus according to the invention includes an intensity calculating unit that calculates intensities of spatial frequencies from facial image data of a subject, a storage unit that stores age correlation data indicating a correlation between ages and intensities of spatial frequencies obtained from the facial image data, an age calculating unit that calculates an estimated age of the subject by matching the intensities of the spatial frequencies calculated by the intensity calculating unit with the age correlation data stored in the storage unit.

Figure 7:
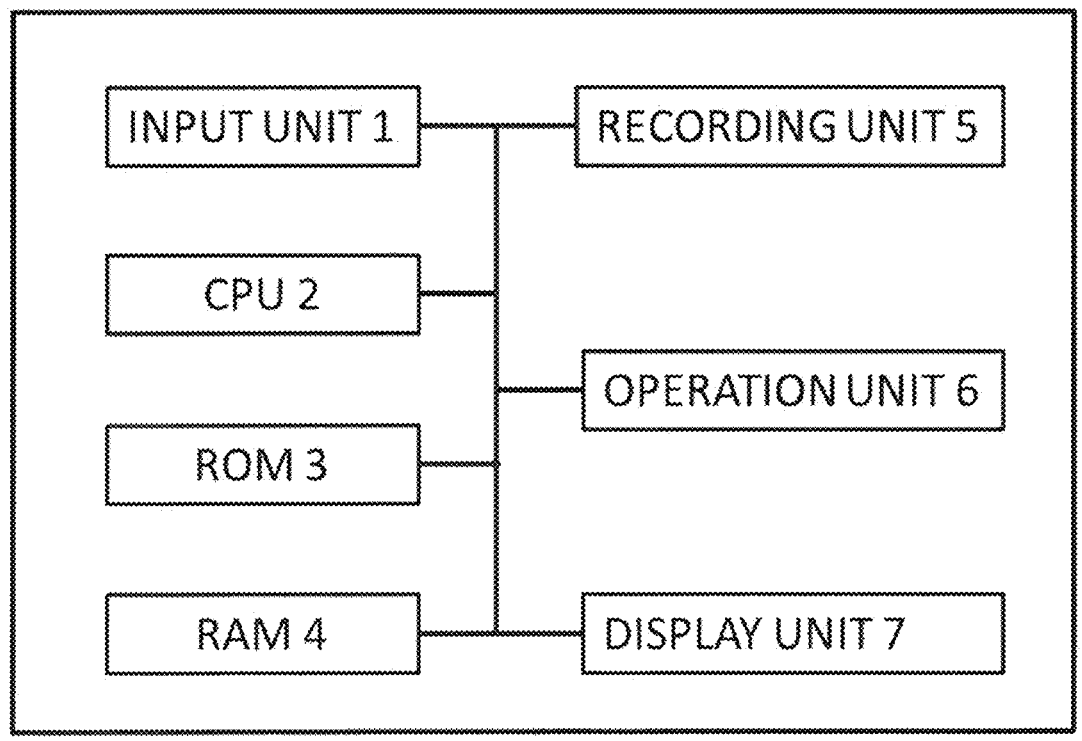
FIG. 7 is a hardware block diagram of an estimation apparatus of an impression age by appearance.

The estimation apparatus according to the invention may be configured as follows, for example. The following configuration is described as an example, and the invention is not limited to the configuration of the embodiment. FIG. 7 is a hardware block diagram illustrating the estimation apparatus that estimates an actual age or an impression age by appearance by using the intensities of the spatial frequencies calculated from the facial image, and includes an input unit 1, a CPU (Central Processing Unit) 2, a ROM (Read Only Memory) 3, a RAM (Random Access Memory) 4, a recording unit 5, an operation unit 6, and a display unit 7. The units are connected to each other through buses.

The intensity calculating unit and the age calculating unit is implemented by the CPU 2. In addition, the storage unit is implemented by the ROM 3.

The input unit 1 is a device to input facial image data, such as a digital camera, a digital microscope, a digital video camera, or a scanner. The CPU 2 performs processes such as preparing a grayscale image data (brightness data), calculating the intensities of the spatial frequencies by a FFT process, and calculating an estimated age by using equations or models (age correlation data) indicating a relation between the ages (the actual ages or the impression ages by appearance) and the intensities of the spatial frequencies by programs stored in the ROM 3. The ROM 3 stores programs required to operate the age estimation apparatus according to the invention, and various equations and models required for the age estimation (age correlation data). The ROM 3 may further store a database required to prepare the equations and the models. The RAM 4 temporarily stores an OS (operating system) programs or various application programs executed on the CPU 2. The recording unit 5 includes magnetic disk device and the like, and is used as an external memory of the RAM 4. The operating unit 6 is operated, for example, at the time of inputting necessary data such as a certain command, equations, and models. The displaying unit 7 may employ any configuration that can display an age estimation result, for example, a display device such as a CRT (Cathode Ray Tubu), or a liquid crystal display, an audio output device such as a speaker, a printer, and the like.

[3] Age Estimation Program According to the Invention

An estimation program according to the invention causes a computer, other devices, other machines, and the like to function as an intensity calculating unit that calculates intensities of spatial frequencies from facial image data of a subject, a storage unit that stores age correlation data indicating a correlation between ages and intensities of spatial frequencies obtained from the facial image data, and an age calculating unit that calculates an estimated age of the subject by matching the intensities of the spatial frequencies calculated by the intensity calculating unit with the age correlation data stored in the storage unit. In addition, the program according to the invention may be stored in computer readable storage media.

[4] Sex Determination Method According to the Invention

A sex determination method according to the invention may include determining a sex of a subject from facial image data of a subject based on a correlation between sexes and intensities of spatial frequencies obtained from the facial image data. The correlation is preferably indicated by an equation or a model.

The equation or the model is preferably a discriminant function.

The facial image data, an acquiring method thereof, a definition of the intensities of the spatial frequencies, and a calculating method thereof used in the sex determination method of the invention are as described in the age estimation method.

In the invention, the sex of the subject is determined based on the correlation between the sexes and the intensities of the spatial frequencies obtained from the facial image data, from the intensities of the spatial frequencies obtained from the facial image data of the subject whose sex is to be determined by the method described above.

Any intensity of a spatial frequency may be used as the spatial frequency used for the determination. Among them, the spatial frequency preferably belongs to a frequency range of 100 to 250 cycles/image-width, and more preferably belongs to a frequency range of 150 to 200 cycles/image-width. As illustrated in Example 4 described later, this is because the difference of the intensities of the spatial frequencies in the high frequency range clearly explains the sex difference.

In addition to the high frequency range, it is preferable to use the intensities of the spatial frequencies in a low frequency range of 1 to 50 cycles/image-width since the determination is performed with a higher degree of accuracy. According to this, the sex difference that is not indicated in the high frequency range may be added.

The correlation between the sexes and the intensities of the spatial frequencies obtained from the facial image data may be calculated in advance by multivariate analysis such as discriminant analysis.

Hereinafter, a method of calculating the correlation will be described with an example of using the intensities of the spatial frequencies obtained from image data of an entire face.

(1) Calculation of Intensity of Spatial Frequency

Intensities of spatial frequencies are calculated from facial image data having a plurality of people. The intensities of the spatial frequencies are calculated as described above.

(2) Preparation of Database (DB)

In order to calculate the correlation, a database (DB) in which sexes and intensities of spatial frequencies are associated with each other is prepared.

The DB that indicates the relation between the sexes and the intensity of the spatial frequencies, and that is arranged in advance for preparing an equation or a model preferably has the same population distribution to each age group. In addition, the population of the DB is at least 50 or more, preferably 100 or more, and more preferably 500 or more. When the structure of the DB is a matrix form, for example, people may be input in rows, and the sex may be input to the column items. The sex may be input as a sex grouping variable. According to this, the correlation may be indicated by a discriminant function.

In addition, the column item may further include impression ages by appearance and actual ages of people captured in the facial images so that the DB may be also included for estimating an actual age as described above.

(3) Preparation of Equation or Model

An equation or a model indicating a correlation with sexes and intensities of spatial frequencies may be prepared by substituting the ages in the estimation of the age into the sex grouping variables in the same manner. That is, the equation obtained by analyzing the sex grouping variables and the intensities of the spatial frequencies by multivariate analysis may be used. Since an external standard which is a sex group is qualitatively given, multivariate analysis is preferably discriminant analysis, a neural network, or the like. In Example 4 as to be described below, the present invention has a very practical technical characteristic of determining the sex with a high degree of accuracy only by using the spatial frequencies without an age as an explanatory variable of the discriminant function.

It is preferable to use intensities of spatial frequencies that belong to a frequency range of 100 to 250 cycles/image-width, and preferably of 150 to 200 cycles/image-width as intensities of spatial frequencies which are explanatory variables in the equation or the model obtained as described above. According to this, the sex difference may be determined accurately. Further, in addition to the high frequency range, it is preferable to use the intensities of the spatial frequencies in the low frequency range of 1 to 50 cycles/image-width. According to this, a determination may be performed more accurately by adding a factor explaining the sex difference that is not indicated in the high frequency range.

(4) Sex Determination

A sex determination is performed by applying the intensities of the spatial frequencies from the facial image data of the subject to the equation or the model that indicates the correlation between the intensities of the spatial frequencies and the sex grouping variable obtained as described above. The application includes matching numerical values to a model in addition to substituting numerical values to the equation.

According to this, the sex grouping variable may be calculated, so the sex may be determined by the sex grouping variable.

In the sex determination method according to the invention, facial image data of a subject whose sex is to be determined is acquired, and a FFT processing is performed on the facial image data to calculate the intensities of the spatial frequencies. The sex grouping variable may be obtained by substituting the intensities of the spatial frequencies (powers or amplitude values) of the subject to an equation (a discriminant function) indicating a "relation between sex grouping variables and intensities of spatial frequencies", as prepared in advance. Based on the obtained sex grouping variables, the sex may be determined.

[5] Sex Determination Apparatus According to the Invention

A determination apparatus according to the invention includes an intensity calculating unit that calculates intensities of spatial frequencies from facial image data of a subject, a storage unit that stores sex correlation data indicating a correlation between sexes and intensities of spatial frequencies obtained from the facial image data, and a sex determining unit that determines the sex of the subject by matching the intensity of the spatial frequencies calculated by the intensity calculating unit with the sex correlation data stored in the storage unit.

The determination apparatus according to the invention may be configured like the age estimation apparatus according to the invention as described above.

[6] Sex Determination Program According to the Invention

A determination program according to the invention causes a computer, other devices, other machines, and the like to function as an intensity calculating unit that calculates intensities of spatial frequencies from facial image data of a subject, a storage unit that stores sex correlation data indicating a correlation between sexes and intensities of spatial frequencies obtained from the facial image data, and an sex determining unit that determines a sex of the subject by matching the intensities of the spatial frequencies calculated by the intensity calculating unit with the sex correlation data stored in the storage unit. In addition, the program according to the invention may be stored in computer readable storage media.

[7] Age Estimation Apparatus According to Another Embodiment

As described above, both of an age estimation method and a sex determination method according to the invention use intensities of spatial frequencies obtained from facial image data.

In addition, it is understood that a correlation between ages and intensities of spatial frequencies that can used in the age estimation differs between male and female.

Here, the age may be estimated with a high degree of accuracy by determining a sex by a sex determination method according to the invention, selecting the correlation between ages and intensities of spatial frequencies optimized for each sex based on the result, and performing the age estimation method according to the invention.

An age estimation apparatus that executes this estimation includes an intensity calculating unit that calculates intensities of a spatial frequencies from facial image data of a subject; a storage unit that stores sex correlation data indicating a correlation between sexes and intensities of spatial frequencies obtained from facial image data, and male age correlation data and female age correlation data indicating correlations between ages and intensities of spatial frequencies obtained from facial image data by sex; a sex determining unit that determines a sex of the subject by matching the intensities of the spatial frequencies calculated by the intensity calculating unit with the sex correlation data stored in the storage unit; an age correlation data selecting unit that selects the male age correlation data or the female age correlation data based on the sex determined by the sex determining unit; and an age calculating unit that calculates an estimated age of the subject by matching the intensities of the spatial frequencies calculated by the intensity calculating unit with the correlation data selected by the correlation data selecting unit.

In addition, a program may be provided to cause a computer to function as these units.

Hereinafter, the invention is more specifically described with examples as described below, but the invention is not limited to the examples.

Example 1

<1> Estimation of Female Age (1) Preparation of Female DB with "Actual Age, Impression Age by Appearance, and Intensity of Spatial Frequency"

Facial images of 140 females (in the age of 18 to 82 years, average age of 49.01±17.02 years) in the range of 30 cm×30 cm are captured by using a digital camera. The spatial frequency analysis is performed on the images by adjusting brightness of the images using Photoshop (registered trademark) CS3 manufactured by Adobe systems Incorporated, obtaining grayscale image (see FIG. 1) data of 1024×1024 pixels, and using the spatial frequency analysis software manufactured by the company of the inventors with MATLAB (registered trademark) manufactured by The MathWork Inc (see FIG. 2). In order to evaluate an impression age by appearance, by using standard pictures by age groups prepared in advance (see FIG. 3), ages of A4-size printed materials of the grayscale images are evaluated by 9 new recruits (5 males and 4 females) who are in the first year after the college graduation and do not have experiences in a facial evaluation study, and 5 experts (2 males and 3 females) in a facial estimation study. A mean value is adopted by excluding the maximum value and the minimum value from the ages estimated as impression ages by appearance. In this manner, a female DB with actual ages, impression ages by appearance (evaluation of new recruits and evaluation of experts), and intensities of spatial frequencies (powers or amplitude values) is prepared.

(2) Analysis of Characteristics of Female DB

By using PASW (registered trademark) Statistics 17.0 manufactured by SPSS Inc., correlation analysis and cluster analysis is performed on the female DB. According to Pearson correlation, coefficient (two tailed) between the ages (the actual ages and the impression ages by appearance) and the intensities of the spatial frequencies (see FIG. 4), it is understood that significantly high aging information exists in a wide range (correlation coefficient>0.60) of 90 to 360 (cycles/image-width). In addition, from the dendrogram obtained by cluster analysis, the spatial frequencies with similar change characteristics in the intensity are classified into four spatial frequency bands as follows. When aging information existing in the respective bands is analyzed by increasing or decreasing the intensities of the spatial frequencies in respective band and changing the facial image data, aging structure information is unevenly distributed in each of the spatial frequency bands, for example, information about tense feelings or flabbiness exists in 0 to 50 (cycle/image-width), information about deep wrinkles and face lines exists in 50 to 100 (cycles/image-width), information about fine wrinkles and the like exists in 100 to 200 (cycles/image-width), and further information about texture or shiny feeling of the skin surface exists in 200 to 512 (cycles/image-width). In addition, since the uneven distribution is presented in all the other DB groups, it is understood that the four spatial frequency bands presented thereby can be respectively defined as bands that have continuity. In addition, it is understood that an improvement in estimating an age or the like is expected to increase with a higher degree of accuracy by selecting appropriate frequencies from the respective spatial frequency groups or by performing a combination thereof.

(3) Preparation of Equation Indicating "Relation Between Actual Ages and Intensity of Spatial Frequencies or Between Impression Ages by Appearance and Intensities of Spatial Frequency"

Figure 8:
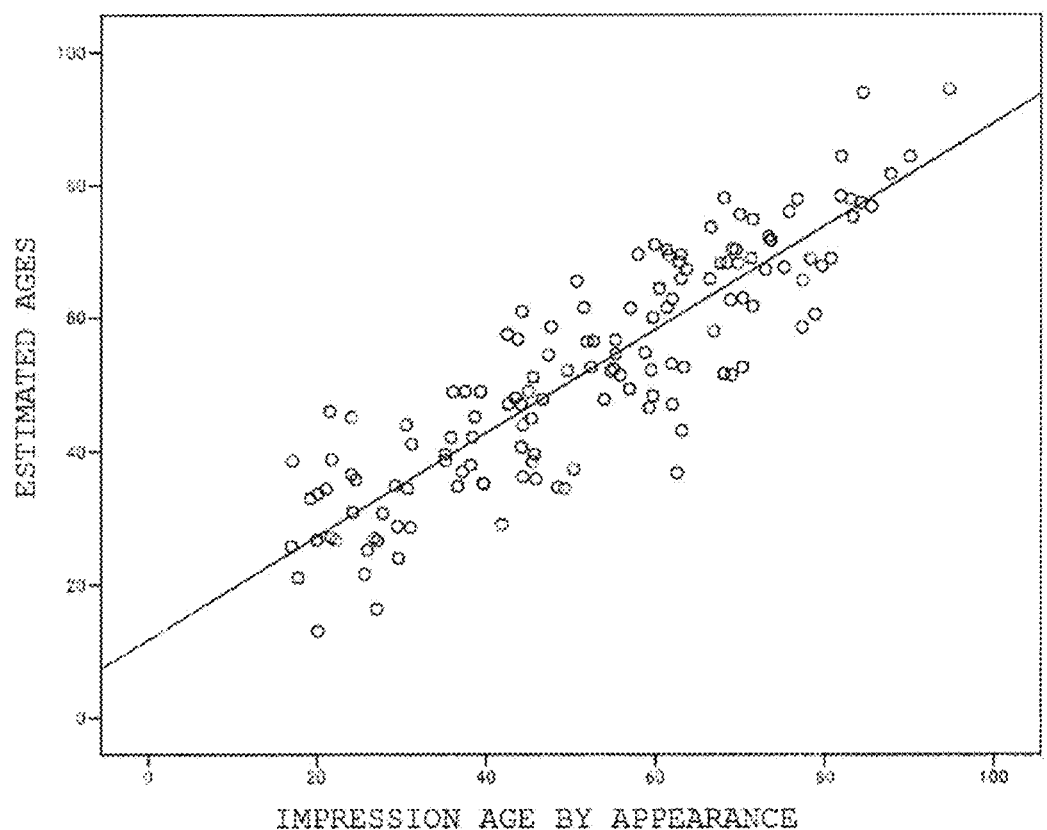
FIG. 8 is a graph (calibration curve) illustrating correlations between the impression age by appearance from a third party and the estimated image obtained by a method according to the invention obtained from Example 1.

Multiple regression analysis (stepwise method) is performed on the female DE with actual ages and impression ages by appearance as objective variables, and with spatial frequencies (f) as explanatory variables by using SPSS (registered trademark) 15.0 J manufactured by SPSS Inc. As a result, the equations (1) and (2), that is, examples of the multiple regression equation estimating an actual age and an impression age by appearance (evaluation by new recruits) are provided. In Equation 2, it is understood that eight explanatory variables are selected from four spatial frequency band groups, so the age may be estimated correctly by selecting appropriate frequencies from the respective spatial frequency groups. FIG. 8 is a graph indicating correlations (a calibration curve) between the impression ages by appearance (evaluation by the new recruits) and the estimated ages (the predicted values) estimated by the equation (2). In addition, when the evaluators of the impression age by appearance are substituted from the new recruits to the experts, the multiple correlation coefficient (R) of the prediction equation increases to 0.937, so it is understood that the impression age by appearance may be estimated with a higher degree of accuracy.

$$\begin{aligned}&\text{<Estimated Value of Actual Age>}=f132\times84.220+f38\times\\&(-52.441)+f155\times48.123+f3\times(-18.802)+f102\times\\&46.773-124.562\end{aligned} \quad (1)$$

Multiple Correlation Coefficient (R)=0.863

*f132, f38, f155, f3, and f102 are logarithmic scales of powers of the spatial frequencies.

$$\begin{aligned}&\text{<Estimated Value of Impression Age by Appearance}\\&\text{(Evaluation of New Recruit)>}=f3\times(-16.407)+\\&f35\times(-42.423)+f36(-37.139)+f43\times43.577+f53\times\\&14.451+f132\times96.466+f142\times65.208+f242\times\\&19.649-198.272\end{aligned} \quad (2)$$

Multiple Correlation Coefficient (R)=0.881

*f3, f35, f36, f43, f53, f132, f142, and f242 are logarithmic scales of powers of the spatial frequencies.

(4) Estimation of Actual Age and Impression Age by Appearance

After intensities of spatial frequencies from facial images of eight female test examinees (subjects) to be estimated (in the average age of 43.1 years) are obtained, actual ages and impression ages by appearance (evaluation of new recruits) are estimated by using the multiple regression equations (1) and (2) calculated as described above. In addition, in the case of using the impression ages by appearance evaluated by the experts, the estimation is performed by calculating the regression equation in a similar manner. The results are listed in Table 1 (Error=Estimated Age−(Actual Age or Impression Age by Appearance)). According to this, it is understood that actual ages and impression ages by appearance may be estimated with a high degree of accuracy. In addition, it is understood that it is preferable to use the multiple regression equation for estimating impression ages by appearance in terms of accuracy, and it is preferable to use impression ages by appearance evaluated by the experts in terms of a higher degree of accuracy.

TABLE 1

| No. | Actual Age | Error (Actual Age) | Error (Impression Age by Appearance New Recruit) | Error (Impression Age by Appearance Expert) |
|---|---|---|---|---|
| 1 | 20 | 1.7 | 1.2 | 0.9 |
| 2 | 25 | −2.3 | −2.0 | −1.2 |
| 3 | 32 | 2.1 | 1.1 | 0.4 |
| 4 | 38 | −4.3 | −3.1 | −1.4 |
| 5 | 44 | −6.1 | −2.0 | −1.6 |
| 6 | 53 | 5.4 | 2.2 | 1.5 |
| 7 | 62 | −2.6 | −1.8 | −1.8 |
| 8 | 71 | 4.5 | 3.3 | 2.4 |

Example 2

<2> Estimation of Male Age

The same review of the Example 1 is performed by substituting females to males, to prepare a male DB, to analyze the characteristic of the DB, and to prepare an equation indicating the "relation between the actual ages and the intensities of the spatial frequencies".

(1) Preparation of Male DB with "Actual Age and Intensity of Spatial Frequency"

As to 139 males (in the age of 19 to 84 years, average age of 51.51±17.83 years), a DB with actual ages and intensities of spatial frequencies (powers and band values) is prepared in the same manner as Example 1.

(2) Analysis of Characteristic of Male DB

Figure 4:
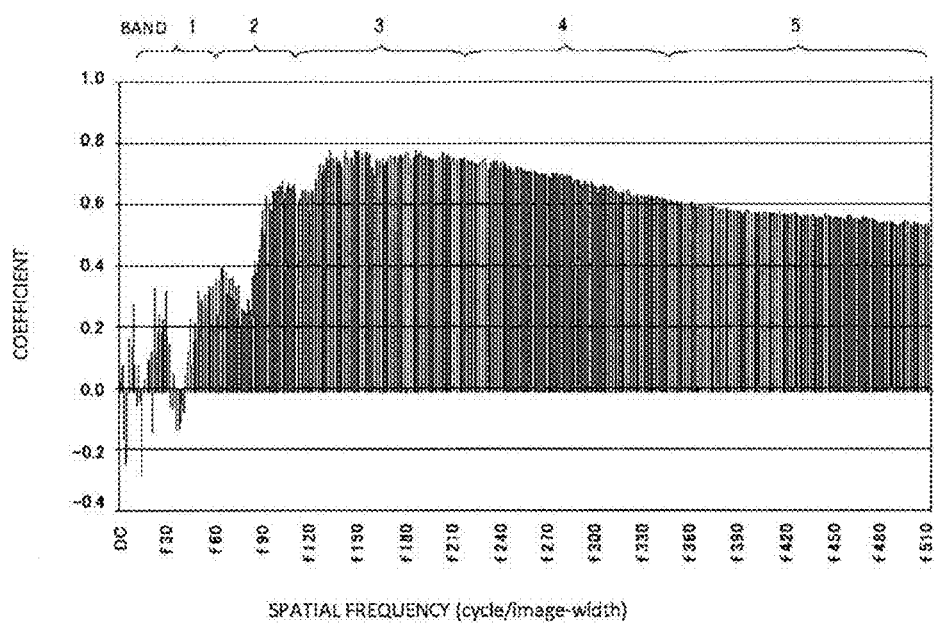
FIG. 4 is a graph indicating correlation coefficients between logarithms of powers of spatial frequencies and actual ages of females according to spatial frequencies.
Figure 5:
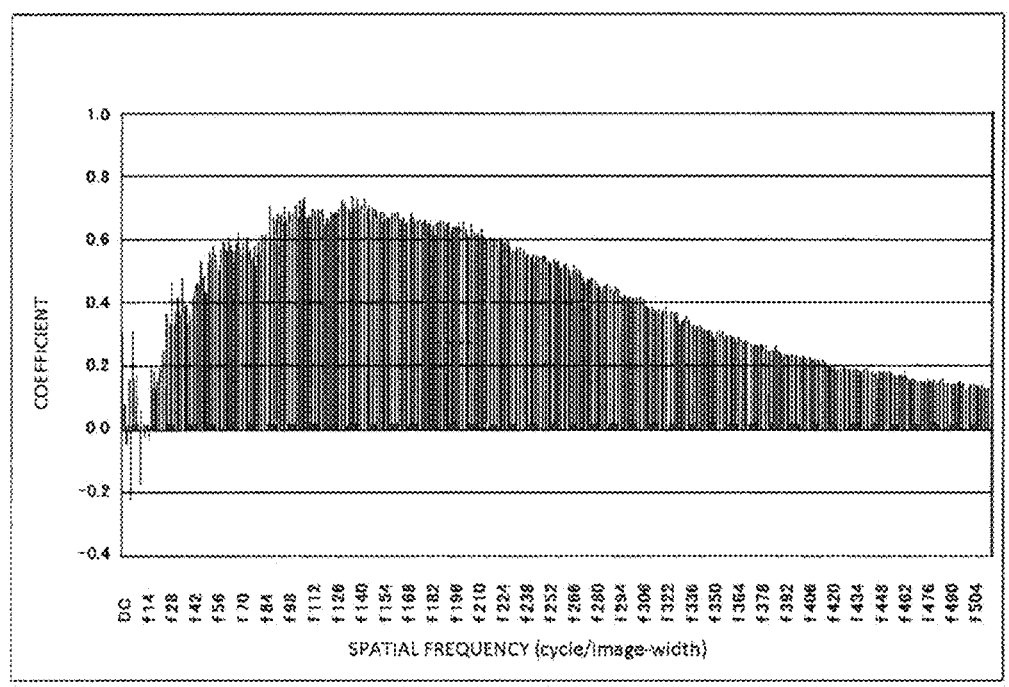
FIG. 5 is a diagram illustrating correlation coefficients between logarithms of powers of spatial frequencies and actual ages of males according to spatial frequencies.

Correlation analysis and cluster analysis are performed on the male DB in the same manner. According to Pearson correlation coefficient (two tailed) between the actual ages and the intensities of the spatial frequencies (see FIG. 5), it is understood that high aging information exists in a range (correlation>0.60) of 60 to 240 (cycles/image-width). By interpreting the dendrogram, it is presented that aging structure information is unevenly distributed per spatial frequency band as presented in the female DB. By comparing the DB of both sexes, the difference presented in FIGS. 4 and 5 is recognized. That is, it is inferred that the difference in the low and medium frequency ranges (20 to 100 cycles/image-width) is caused because a rapid change of a male in an aging structure such as tension or flabbiness is more noticeable than that of a female, and the difference in the high frequency range (200 cycles/image-width or more) is caused because the skin texture (rough feeling, fineness in texture) of a male is worse than a female regardless of age and a change of a male in an aging structure is hardly noticeable.

That is, it is understood that in case of a male, it is effective to use the band of about 0 to 200 cycles/image-width for estimating an age. In addition, like the analysis of the female DB, it is understood from the interpretation of the dendrogram, that different aging information exists in band ranges of 0 to 50 cycles/image-width, 50 to 100 cycles/image-width, 100 to 150 cycles/image-width, and 150 cycles/image-width or more.

(3) Preparation of Equation Indicating "Relation Between Actual Age and Intensity of Spatial Frequency"

Multiple regression analysis (stepwise method) is performed on the male DE of Example 2 with actual ages as objective variables, and with spatial frequencies (f) as explanatory variables by using SPSS (registered trademark) 15.0 manufactured by SPSS Inc. As a result, the equation (3), an example of the multiple regression equation for estimating an actual age is expressed as follows.

$$\text{<Estimation Value of Actual Age>} = f135 \times 80.839 + f5 \times (-23.510) + f3 \times (-10.595) + f105 \times 64.765 - 164.187 \quad (3)$$

Multiple Correlation Coefficient (R)=0.794

*f135, f5, f3, and f105 are logarithmic scales of powers of the spatial frequencies.

(4) Estimation of Actual Age

Like a female age estimation method, an actual age is estimated by using Multiple Regression Equation (3) calculated as described above, after the intensities of the spatial frequencies are obtained from facial image data of five male test examinees (subjects) to be estimated (an average age of 40.8 years). The results are listed in Table 2 (Error=Estimated Age−(Actual Age)). According to this, it is understood that the actual age is estimated with a high degree of accuracy.

TABLE 2

| No. | Actual Age | Error |
|---|---|---|
| 1 | 21 | 1.9 |
| 2 | 28 | −2.2 |
| 3 | 36 | 2.0 |
| 4 | 53 | −5.1 |
| 5 | 66 | 4.6 |

Example 3

<3> Makeup Effect on Impression Age by Appearance

Figure 9:
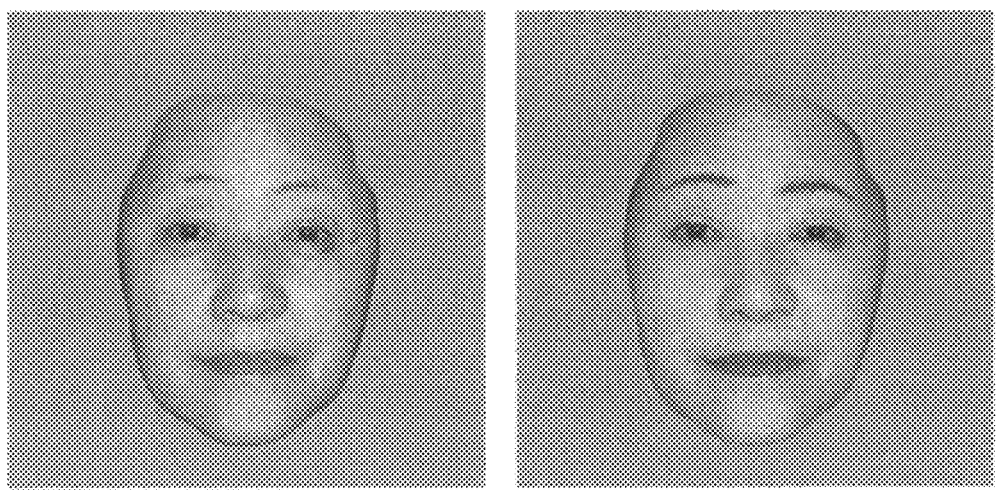
FIG. 9 is grayscale images of a natural face (right) and a makeup face (left) of a 62-year-old woman used in Example 3 (a photograph as a substitute for a drawing).

The effect of makeup on an impression age by appearance is considered according to the invention. That is, after the process of Example 1 is performed on the bare faces and the makeup faces of two females (in the age of 50 and 62 years) to calculate the spatial frequencies, the multiple regression equation (2) for estimating an impression age by appearance is applied to calculate the impression ages by appearance evaluated from the bare faces and the makeup faces. When the age errors of the makeup faces from the bare faces as standards are calculated, it is resulted that the age error of the 50-year-old female is +0.7 years to present that the appearance hardly changes, while the age error of the 62-year-old female (see FIG. 9) is −9.8 years to present that the appearance looks much younger, and it is understood that the calculation of the impression age by appearance is a quantitative technique that is identical to the evaluation by the third party. Further, since the makeup effect is evaluated from grayscale images, the effect of the color and the saturation by cosmetic materials is not reflected, but the effect of the cosmetic materials on the aging structure may be inferred quantitatively from the changes of the weights of the explanatory variables (respective spatial frequency bands from grayscale images) in the multiple regression equation (2).

Example 4

<4> Sex Determination (Determination Equation and Discriminant Analysis Result)

Figure 10:
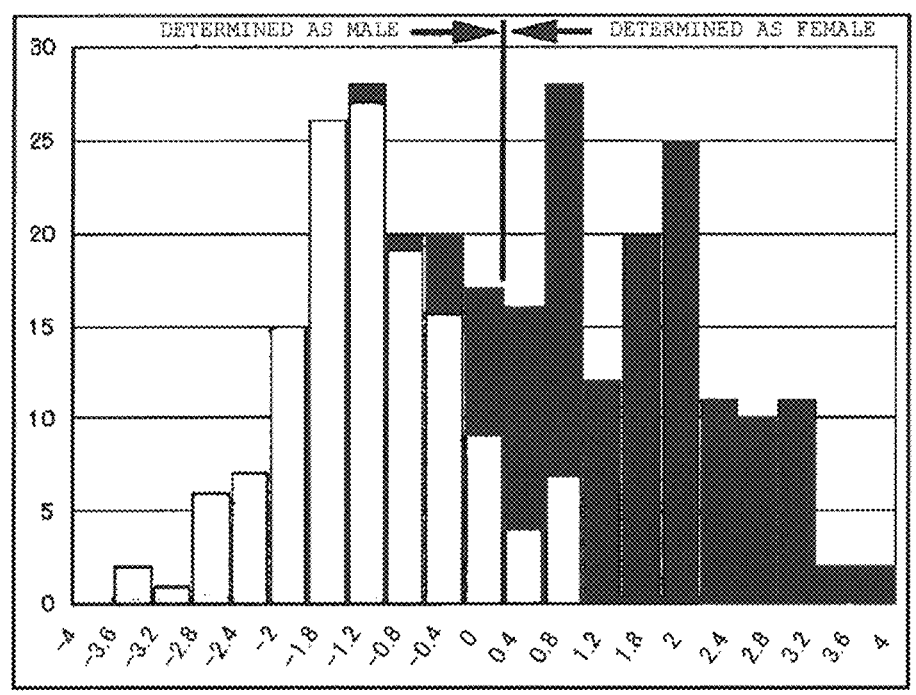
FIG. 10 is a graph illustrating a histogram of scores of linear discriminant function in determining sex obtained in Example 4.

As described in Example 1, images are obtained and processed to obtain the intensities of the spatial frequencies from the female DB in Example 1 (N=140) and the male DB (N=139) in Example 2. The items of sex grouping variables are added to the DBs, and then discriminant analysis is performed by using PASW (registered trademark) Statistics 17.0 manufactured by SPSS Inc. The obtained discriminant function (the determination equation (4) and the determination result (Table 3 and FIG. 10) are presented as follows. It is understood that the sex determination is performed with the accuracy of 90% or more from Table 3 and FIG. 10. In addition, the logarithmic scale of power of f173 influences most in the determination equation (4), but as described above, this is caused by the sex difference in the change in the texture of skin surface due to aging (see FIGS. 4 and 5). Therefore, it is understood that the skin texture is more important than the formative change of the face (wrinkles and flabbiness) in the sex determination. In addition, according to this, it is inferred that a cheek, a forehead, a nose, in addition to the entire face, are adequately used for facial image data used in the sex determination.

$$\text{<Linear Discriminant Function>} = f3 \times 1.564 + f6 \times 3.340 + f7 \times 3.141 + f41 \times 0.669 + f173 \times (-8.400) - 8.895 \quad (4)$$

Canonical Correlation Coefficient (R)=0.811

*f3, f6, f7, f41, and f173 are logarithmic scales of powers of the spatial frequencies.

TABLE 3

|  |  | Sex | Female | Male | Total |
|---|---|---|---|---|---|
| Original Data | Frequency | Female | 126 | 14 | 140 |
| Original Data | Frequency | Male | 11 | 128 | 139 |
| Original Data | % | Female | 90 | 10 | 100 |
| Original Data | % | Male | 8 | 92 | 100 |
| Cross Validation | Frequency | Female | 124 | 16 | 140 |
| Cross Validation | Frequency | Male | 11 | 128 | 139 |
| Cross Validation | % | Female | 89 | 11 | 100 |
| Cross Validation | % | Male | 8 | 92 | 100 |

Example 5

<5> Age Estimation by Using Color Image (1) Preparation of DB with "Actual Age and Intensity of Spatial Frequency"

Color images of 140 females in the ages of 18 to 82 years, the average age of 49.01±17.02 years) in the range of 30 cm×30 cm are obtained by using a digital camera. Spatial frequency analysis is performed on color images of 1024× 1024 pixels by using the spatial frequency analysis software manufactured by the company of the inventors with MATLAB (registered trademark) manufactured by The MathWork Inc. Subsequently, a female DB with actual ages and intensity of spatial frequencies is prepared.

(2) Analysis of Characteristic of DB

Correlation analysis is performed on the female DS with PASW (registered trademark) Statistics 17.0 manufactured by SPSS Inc. As a result, the correlation coefficients of B and R channels are different from the correlation of the spatial frequencies obtained from the monochrome image data. That is, the correlations of B channel tend to be high in the band of 50 to 150 cycles/image-width. In addition, the correlations of the B channel tend to be high in the band of 0 to 50 cycles/image-width.

When the images are changed by changing the powers of the bands of the channels, it is understood that the information on freckles exists in the range of the channel.

(3) Preparation of Equation Indicating "Actual Age and Intensity of Spatial Frequency"

Multiple regression analysis (stepwise method) is performed on the DB with actual ages as objective variables, and with spatial frequencies (f) as explanatory variables by using PASW (registered trademark) Statistics 17.0.3 to obtain a multiple regression equation.

As a result, the intensities of the spatial frequencies belonging to 100 to 150 cycles/image-width of the B channel have the highest correlation coefficients. The intensities of the spatial frequencies are selected from all the RGB channels as explanatory variables.

Figure 11:
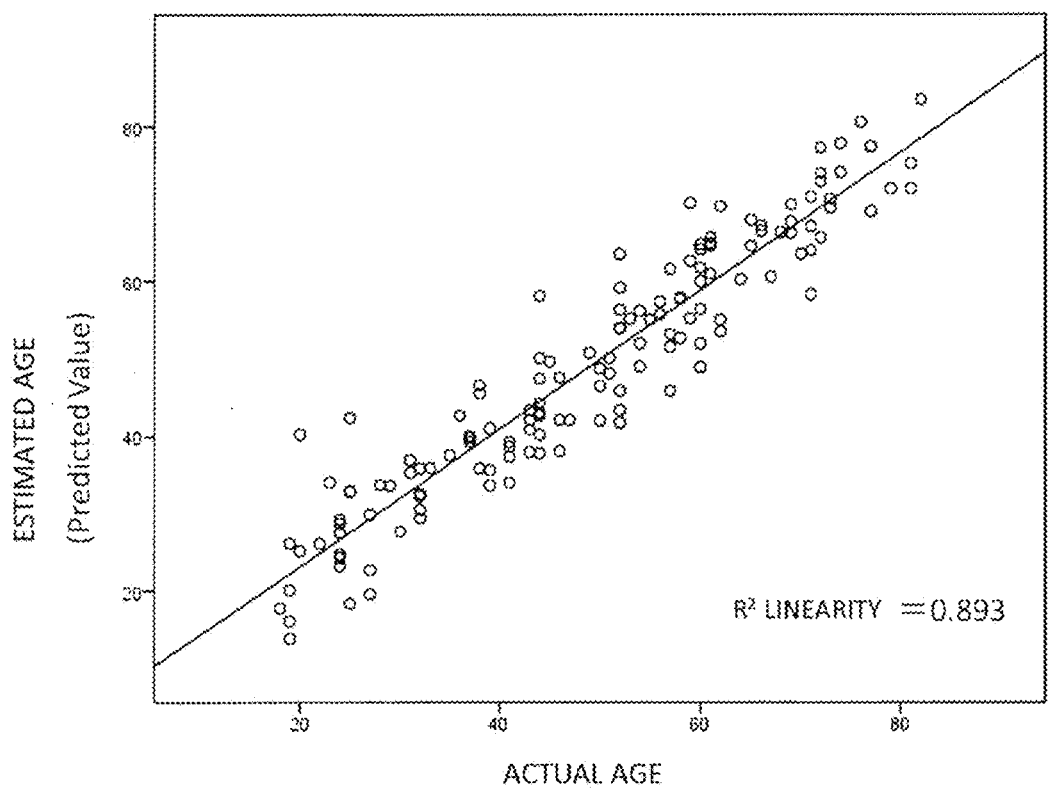
FIG. 11 is a graph (calibration curve) illustrating correlations between actual ages obtained in Example 5 and estimated ages obtained by a method according to the invention.

FIG. 11 is a graph indicating correlations (a calibration curve) between actual ages and estimated ages (prediction values) estimated by the obtained multiple regression equation. It is understood that the multiple correlation coefficient (R) is 0.945, and the actual age is estimated with an extremely high degree of accuracy.

Example 6

<6> Age Estimation by Using Lip Image (1) Preparation of DB with "Actual Age and Intensity of Spatial Frequency"

The facial images of 140 females (in the ages of 18 to 82 years, the average age of 49.01±17.02 years) are obtained by using a digit camera. The color images of 1024×1024 pixels for interpretation is prepared by overlaying mask layers for extracting lip portions from the facial images. Spatial frequency analysis is performed on four types of the image data obtained from the color images that are image data from the RGB channels and the monochrome image data obtained by brightness conversion by using the spatial frequency analysis software manufactured by the company of the inventors with MATLAB (registered trademark) manufactured by The MathWork Inc. Subsequently, a DB with actual ages and intensities of spatial frequencies (powers and amplitude values) is prepared.

(2) Analysis of Characteristic of DB

Correlation analysis is performed on the DB by using PASW (registered trademark) Statistics 17.0 manufactured by SPSS Inc. As a result, a tendency that the correlation coefficients of the B channel are different from the correlation of the spatial frequencies obtained from the monochrome image data is found. That is, the correlations of B channel are especially high in the band of about 170 to 180 cycles/image-width where the correlation is generally high. According to this, it is understood that the important aging information on lips is included in the band of 150 to 200 cycles/image-width of the B channel.

In addition, cluster analysis is performed on the spatial frequencies of the monochrome image. The conditions are Ward's method, squared Euclidean distance and z-scores (per variables). As a result, the spatial frequencies are classified into four ranges of 0 to 40 cycles/image-width, 40 to 100 cycles/image-width, 100 to 240 cycles/image-width, and 240 to 512 cycles/image-width. When aging information existing in the respective bands is analyzed by increasing or decreasing the intensities of the spatial frequencies in the bands and changing the facial image, it is understood that aging information rarely exists in the range of 240 to 512 cycles/image-width.

(3) Preparation of Equation Indicating "Relation Between Actual Age and Intensity of Spatial Frequency"

Multiple regression analysis (stepwise method) is performed on the DB with actual ages as objective variables, and with spatial frequencies (f) as explanatory variables by using PASW (registered trademark) Statistics 17.0 thereby obtaining a multiple regression equation.

As a result, a plurality of the intensities of the spatial frequencies belonging to 1 to 200 cycles/image-width of the R and B channel are selected as explanatory variables. Among them, the intensities of the spatial frequencies belonging to 170 to 180 cycles/image-width of the B channel have the highest correlation coefficients.

Figure 12:
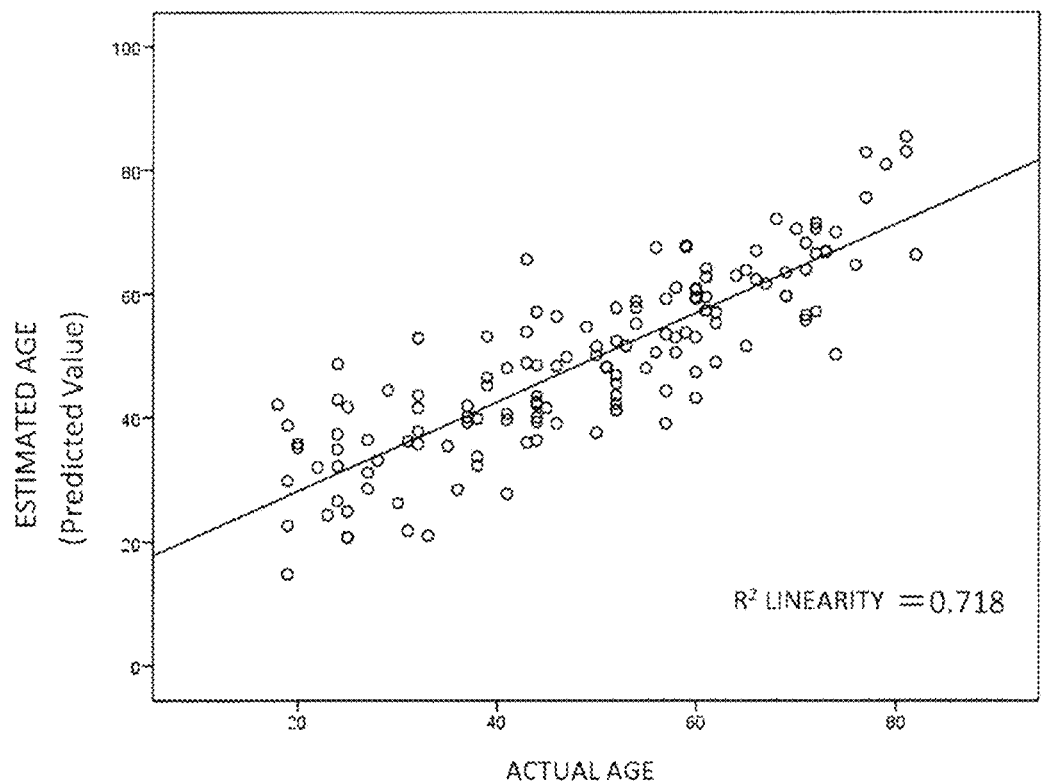
FIG. 12 is a graph (calibration curve) illustrating correlations of actual ages obtained in Example 6 and an estimated ages obtained by a method according to the invention.

FIG. 12 is a graph indicating correlations (a calibration curve) between actual ages and estimated ages (prediction values) estimated by the obtained multiple regression equation. It is understood that the multiple correlation coefficient (R) is 0.848, and the actual age is estimated with a high degree of accuracy.

Example 7

<7> Age Estimation by Using Cheek Image (1) Preparation of DB with "Actual Age and Intensity of Spatial Frequency"

The facial images of 140 females (in the ages of 18 to 82 years, the average age of 49.01±17.02 years) are obtained by using a digital camera (see FIG. 1). The color image data of 1024×1024 pixels for interpretation is prepared by overlaying mask layers for extracting cheek portions from the facial images. Spatial frequency analysis is performed on four types of the image data that are image data from the RGB channels and the monochrome image data obtained by brightness conversion by using the spatial frequency analysis software manufactured by the company of the inventors with MAT-LAB (registered trademark) manufactured by The MathWork Inc. Subsequently, a DB with actual ages and intensities of spatial frequencies is prepared.

(2) Preparation of Equation Indicating "Relation Between Actual Age and Intensity of Spatial Frequency"

Multiple regression analysis (stepwise method) is performed on the DB with actual ages as objective variables, and with spatial frequencies (f) as explanatory variables by using PASW (registered trademark) Statistics 17.0 thereby obtaining a multiple regression equation. As a result, a plurality of the intensities of the spatial frequencies belonging to 1 to 200 cycles/image-width of all the RGB channel are selected as explanatory variables. Among them, the intensities of the spatial frequencies belonging to 150 to 170 cycles/image-width of the B channel have the highest correlation coefficients.

Figure 13:
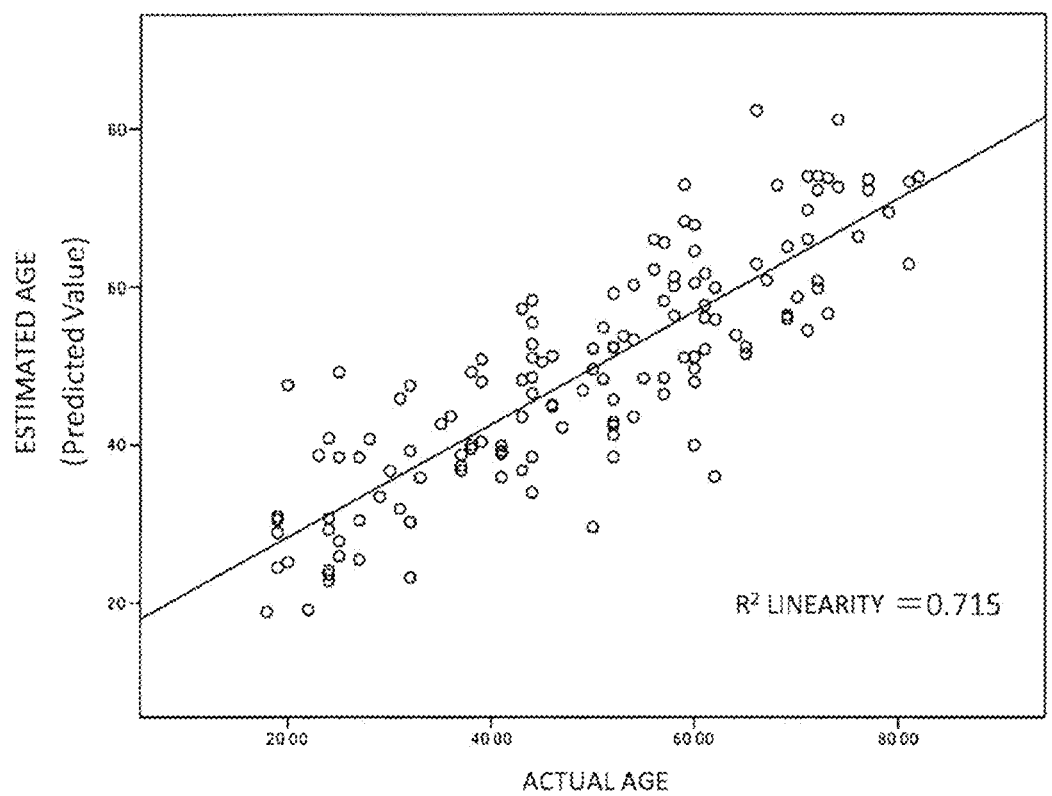
FIG. 13 is a graph (calibration curve) illustrating correlations of an actual ages obtained in Example 7 and estimated ages obtained by a method according to the invention.

FIG. 13 is a graph indicating correlations (calibration curve) between actual ages and estimated ages (prediction values) estimated by the obtained multiple regression equation. It is understood that the multiple correlation coefficient (R) is 0.846, and the actual age is estimated with a high degree of accuracy.

From the results of the Examples 6 and 7, it is understood that the age may be estimated with a high degree of accuracy by using the portions of the face such as lips and a cheek. It is also understood that the spatial frequency bands that have aging information change according to the portions, but the bands may be specified by performing correlation analysis. According to this, it is understood that the age may be estimated by using a certain portion of the face that may change according to aging.

INDUSTRIAL APPLICABILITY

The technology for estimating an age according to the invention may be used in evaluating the effects of esthetic treatments, skin care, makeup, health foods, cosmetic surgeries, or the like, and in advices or counseling with the evaluation result. In addition, the technique for estimating an age or determining a sex may be widely used in a system for monitoring liquor, cigarettes, or the like or as marketing information.

The invention claimed is:

1. An age estimation method comprising:
capturing facial image data of the subject using a digital camera;
calculating intensities of spatial frequencies of the facial image data of the subject using an intensity calculating unit, the calculated spatial frequencies belonging to a plurality of different spatial frequency bands; and
calculating an estimated age of the subject from the calculated intensities of spatial frequencies using an age calculating unit that compares the calculated intensities of spatial frequencies with age correlation data stored in a storage unit showing a correlation between ages and intensities of spatial frequencies previously obtained from facial image data.

2. The age estimation method according to claim 1, wherein the correlation is shown by an equation or a model, and the method comprising:
calculating the estimated age of the subject by applying the calculated intensities of the spatial frequencies from the facial image data of the subject to the equation or the model.

3. The age estimation method according to claim 2, wherein the equation is a multiple regression equation obtained from multiple regression analysis or a prediction equation obtained from PLS.

4. The age estimation method according to claim 1, wherein the facial image data is image data of a portion of a face or an entire face.

5. The age estimation method according to claim 1, wherein the estimated age is an estimated actual age or an estimated impression age by appearance.

6. The age estimation method according to claim 1, wherein the facial image data is color image data, and the calculated intensities of the spatial frequencies include combinations of the intensities of the spatial frequencies calculated from a plurality of color channels.

7. The age estimation method according to claim 1, wherein the spatial frequency bands include a low frequency band of 50 cycles/image-width or less and a high frequency band of larger than 50 cycles/image-width.

8. The age estimation method according to claim 1, wherein the spatial frequency bands have a difference of 10 cycles/image-width or more.

9. The age estimation method according to claim 1, wherein the subject is a female,
the correlation is a correlation between ages and intensities of spatial frequencies previously obtained from facial image data of entire faces of females, and
the previously obtained spatial frequencies include at least four spatial frequencies that belong to respective spatial frequency bands as follows:
0 to 50 cycles/image-width;
50 to 100 cycles/image-width;
100 to 200 cycles/image-width; and
200 cycles/image-width or more.

10. The age estimation method according to claim 1, wherein the subject is a male,
the correlation is a correlation between ages and intensities of spatial frequencies previously obtained from facial image data of entire faces of males, and
the previously obtained spatial frequencies include at least four spatial frequencies that belong to respective spatial frequency bands as follows:
0 to 50 cycles/image-width;
50 to 100 cycles/image-width;
100 to 150 cycles/image-width; and
150 cycles/image-width or more.

11. The age estimation method according to claim 1, wherein the correlation is a correlation between ages and intensities of spatial frequencies previously obtained from image data of lips,
the previously obtained spatial frequencies include at least three spatial frequencies that belong to respective spatial frequency bands as follows:
0 to 40 cycles/image-width;
40 to 100 cycles/image-width; and
100 cycles/image-width or more.

12. The age estimation method according to claim 1, further comprising, after calculating the estimated age:
comparing the estimated age of the subject with an actual age of the subject.

13. The age estimation method according to claim 1, further comprising, before capturing the facial image data of the subject:
applying a cosmetic on a face of the subject, and
after calculating the estimated age:
evaluating the cosmetic by comparison of the estimated age of the subject with an estimated age of a bare face of the subject.

14. The age estimation method according to claim 1, further comprising, after capturing facial image data of the subject,
storing the facial image data of the subject electronically.

15. An age estimation method comprising:
acquiring facial image data of the subject using a digital camera;
calculating intensities of spatial frequencies from the acquired facial image data using an intensity calculating unit, the calculated spatial frequencies belonging to a plurality of different spatial frequency bands; and
calculating an estimated age of the subject using an age calculating unit by applying the calculated intensities of the spatial frequencies to an equation or model stored in a storage unit.

16. The age estimation method according to claim 15, further comprising, after calculating the estimated age:
comparing the estimated age of the subject with an actual age of the subject.

17. The age estimation method according to claim 15, further comprising, before acquiring the facial image data of the subject:
applying a cosmetic on a face of the subject, and
after calculating the estimated age:
evaluating the cosmetic by comparison of the estimated age of the subject with an estimated age of a bare face of the subject.

18. The age estimation method according to claim 15, further comprising, after acquiring facial image data of the subject,
storing the facial image data of the subject electronically.

19. An age estimation apparatus comprising:
an intensity calculating unit that calculates intensities of spatial frequencies from facial image data of a subject;
a storage unit that stores age correlation data showing a correlation between ages and intensities of spatial frequencies previously obtained from facial image data, the previously obtained spatial frequencies belonging to a plurality of different spatial frequency bands; and
an age calculating unit that calculates an estimated age of the subject by matching the intensities of the spatial frequencies calculated by the intensity calculating unit with the age correlation data stored in the storage unit.

20. A non-transitory computer-readable storage medium storing an age estimation program that when executed causes a computer to:
calculate intensities of spatial frequencies from facial image data of a subject; and
calculate an estimated age of the subject by matching the intensities of the calculated spatial frequencies with age correlation data stored in a storage unit that shows a correlation between ages and intensities of spatial frequencies previously obtained from facial image data, the spatial frequencies of the age correlation data belonging to a plurality of different spatial frequency bands.

* * * * *